United States Statutory Invention Registration [19]

[11] Reg. Number: H993

Sartore

[43] Published: Nov. 5, 1991

[54] THIN FILM THICKNESS MAPPING TECHNIQUE

[75] Inventor: Richard G. Sartore, Bradley Beach, N.J.

[73] Assignee: The United States of America as represented by the Secretary of the Army, Washington, D.C.

[21] Appl. No.: 583,612

[22] Filed: Sep. 17, 1990

[51] Int. Cl.[5] ..... G01N 23/02

[52] U.S. Cl. ..... 250/307; 250/306; 250/310

[58] Field of Search ..... 250/306, 307, 310, 399

[56] References Cited

U.S. PATENT DOCUMENTS

H589 2/1989 Sartore ..... 250/307

4,777,364 10/1988 Sartore ..... 250/307

*Primary Examiner*—Bernarr E. Gregory

*Attorney, Agent, or Firm*—Michael Zelenka; William H. Anderson

[57] ABSTRACT

A narrow, high energy, electron beam is caused to impinge upon an integrated circuit. The accelerating voltage of the electron beam is increased until the electrons have just enough energy to penetrate through the thickness of the passivation layer of the integrated circuit. The accelerating voltage is then increased a predetermined amount (3–5 KeV) above the voltage required for passivation layer penetration. The transmitted electrons interact with the sublayer of thin film material and generate distinct X-rays. The increased-intensity electron beam is x/y or raster scanned over the area of interest of the integrated circuit. The X-ray intensities generated during the raster scan are detected and stored. After a complete scan of the area of interest, the X-ray intensities are read, processed through a formula that compensates for absorption effects, and visually displayed. Through correlation of measured and predicted X-ray intensities, a three dimensional scanning thickness map is available for display and/or quantitative analysis of the thickness profile of the integrated circuit.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SCANNING THICKNESS MAP

CALCULATED X-RAY INTENSITY

THIN FILM THICKNESS MAPPING TECHNIQUE

GOVERNMENT INTEREST

The invention described herein may be manufactured, used, and licensed by the U.S. Government for governmental purposes without the payment to me of any royalties thereon.

TECHNICAL FIELD

The present invention relates to a method of detecting defects and mapping the thickness of the passivation layer(s) of thin films using an energy dispersive X-ray analysis technique.

BACKGROUND OF THE INVENTION

Heretofore a method of mapping the passivation layers of integrated circuits was disclosed by the applicant herein in U.S. Pat. No. 4,777,364, entitled "Defect Detection and Thickness Mapping of the Passivation Layer(s) of Integrated Circuits," issued Oct. 11, 1988. In accordance with this patent, a penetration voltage method is used to determine the energy required by an electron beam to penetrate a passivation layer of an integrated circuit. As disclosed therein, an accelerating electron beam voltage is applied to an integrated circuit and is varied until the electrons have just enough energy to penetrate through the thickness of the passivation layer. Then, the acceleration voltage is increased to a predetermined amount (i.e., at least 3 KeV) so that the electron beam penetrates into the integrated circuit thin film and thereby interacts with the sublayer or film material to generate X-rays. The X-rays, in turn, are detected by an energy dispersive X-ray analyzer. The increased intensity-electron beam is x/y "raster" scanned over the area of the film and the generated X-ray intensity is stored at each pixel and displayed on a cathode ray tube.

With this method, however, greater accuracy is required in order to perform reliability tests on VHSI circuits and to map thickness profiles of the passivations layer in three dimensions. This lack of accuracy is due to a lack of resolution in the x-y plane which is a result of the averaging techniques employed by this method and it is due to a lack of specific correction for absorption effects in thin films. Accordingly, it is an objective of those who design VHSI circuits to obtain detailed thickness profiles of integrated circuits. The present invention addresses this objective.

SUMMARY OF THE INVENTION

It is the primary objective of the present invention to provide a method of more accurately determining and mapping the thicknesses of thin films.

A related object of the present invention is to provide for the localization of the thin film thickness to micron and submicron dimensions in order make three dimensional maps of thin film thicknesses.

These and other objectives are accomplished by the present invention which improves upon U.S. Pat. No. 4,777,364 by compensating for absorption effects of X-rays through out the thin film layers. The compensation of the absorption effects of X-rays is accomplished through an algorithm that converts the raw X-ray intensity data into values of thin film thickness. Since the electron beam is scanned across the sample surface with a very high x-y spacial resolution, the film thickness can also be highly localized in the X-Y plane and plotted as a three dimensional scanning thickness map. This can be done internally by the computer that creates the map image for the cathode ray tube.

BRIEF DESCRIPTION OF THE DRAWINGS

The invention will become more fully appreciated from the following detailed description when the same is considered in connection with the accompanying drawings, in which.

DETAILED DESCRIPTION OF THE INVENTION

The present invention being an improvement over U.S. Pat. No. 4,777,364, said patent is incorporated herein by reference hereto. However, for convenience, excerpts from that patent are included in the description below.

Figure 1:
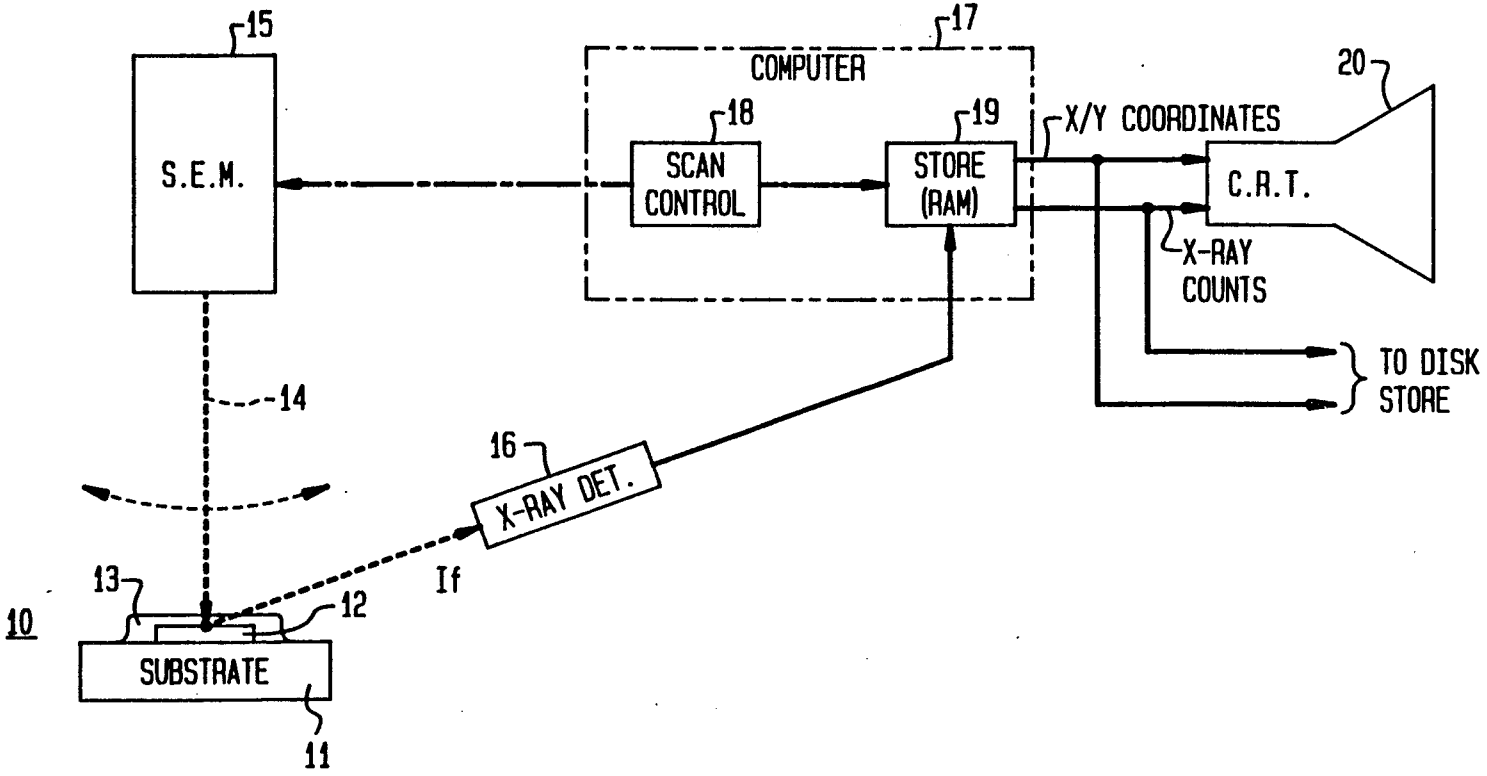
FIG. 1 is a schematic block diagram of the apparatus arrangement used in implementing the technique of the present invention.

With reference to FIG. 1 of the drawings, the enlarged integrated circuit 10 comprises a substrate 11 (typically silicon), a thin film 12, for example, aluminum, which is etched or processed to a particular design specification, and a passivation or insulation layer 13, for example, silicon dioxide (SiO2). In order to determine the thickness of this passivation layer, a narrow, high energy, electron beam 14 is generated by a scanning electron microscope (SEM) 15 and impinges upon the integrated circuit 10. As is known to those conversant with this art, the electron beam can be directed to a very specific point on the integrated circuit (+/− one micron). The voltage of the electron beam 14 is accelerated in intensity so that the electrons will penetrate into the integrated circuit 10. As a consequence, the transmitted electrons interact with the materials of the integrated circuit 10 so as to generate X-rays. These X-rays are then detected by the X-ray detector 16, which is a commercially available device, as is the SEM. The characteristic X-rays from the passivation layer 13 and from the thin film layer 12 are distinct since they are of different wave lengths ($\lambda$).

A penetration voltage method is used to determine the accelerating voltage required for passivation layer penetration and, as a corollary, the thickness of the passivation layer at the point of the electron beam impingement. Briefly, in this method, the accelerating voltage of the electron beam 14 is varied (i.e., increased in incremental steps) until the electrons have just enough energy to penetrate the thickness of the passivation layer 13. This penetration voltage method is the subject of Statutory Invention Registration (SIR) H589 and entitled Measurement of Film Thickness of Integrated Circuits. Accordingly, SIR H589 is incorporated by reference hereto.

Once the penetration accelerating voltage is determined and, its corollary, the passivation layer thickness is found to be within an acceptable thickness range (e.g., +/−0.2 microns at 0.7 microns thickness), the energy of the beam is increased and the electron beam 14 is caused to scan in an x/y "raster" fashion. More specifically, the accelerating beam is increased at least 3 KeV above the accelerating voltage required for passivation layer penetration. In practice, an increase in the accelerating voltage in the 3-5 KeV range has proven to be satisfactory, with less likelihood of damaging the integrated circuit 10. Furthermore, if the intensity of the electron beam is increased as indicated, a linear relationship is found to exist between the X-ray intensity (If) and the thickness of the passivation layer, the thin film material 13. Thus, the measured X-ray can be used to provide a direct indication of passivation thickness.

The computer 17 comprises scan control apparatus 18 and a Storage capacity 19, such as random access memory (RAM or DRAM). The scan control 18 develops necessary x and y coordinates signals and these are delivered to the scan coils (not shown) of the SEM, 15. In this manner, the increased intensity electron beam 14 is scanned over the area of interest on the integrated circuit 10. For the typical integrated circuit, an X-ray map of 128×128 pixels was found to be satisfactory. However, with the present invention, the pixel array can be adapted and converted for three dimensional mapping of the thickness of the passivation layer. The acquisition time at each pixel is preferably 0.01–0.04 seconds. For best resolution of the defects more X-ray counts are desirable and, therefore, an acquisition of time of 0.04 seconds is preferable, but the invention is in no way limited thereto. A computer made by Digital Equipment Corporation was used for the stated purpose, but a computer made by any other computer manufacturer can be readily utilized instead.

The x/y raster scan signals generated by the control computer 18 are also coupled to the storage capacity 19 as are the X-ray counts from the scanned pixels. Thus, the stored X-ray counts correspond spatially to the X-rays generated by the impingement of the electron beam 14 as it is scanned over the pixels of the thin film layer 12. After storage, the stored raster of X-ray counts are altered by an algorithm which compensates for the absorption of X-rays in the thin film layers. This algorithm is described more fully below. Once this calculation is completed, the X-ray intensities as represented by the thin film thickness are read out and delivered to a display device, such as a cathode ray tube (CRT) 20. The CRT will provide a visual thickness map of the passivation layer on the scanned integrated circuit. If the passivation layer 13 has a defect or is too thin, it will visually show up as thickness modulated intensity variation of the characteristic X-rays from the sublayer or thin film material.

In addition to an immediate visual display, the X-ray map information can also be delivered to a disk store for later evaluation nd quantitative analysis as described in U.S. Pat. No. 4,777,364. As will be readily apparent to those skilled in the art, all of the apparatus utilized in the arrangement of FIG. 1 are commercially available.

The absorption of X-rays in thin films may be compensated for by the following equation:

$$T=A-B*In+C*In^2-D*IN^3 \qquad \text{Eq. (1)}$$

wherein

T is the thickness of the thin film in microns;

A, B, C, and D are constants that may be derived from computations for any given combination of sublayer/passivation layer and electron beam voltage; and In is the ratio of the sublayer X-rays from under the passivation layer to the sublayer X-rays from a selected reference point on the integrated circuit or In may equal Ifilm/Iref, wherein Iref is the X-ray intensity of the Al(Ka) line from the sublayer on a bond pad. In could also be a reference point of a known thickness in the passivation layer which may be calculated utilizing the algorithms disclosed in U.S. Pat. No. 4,777,364 or SIR H589.

In order to compensate for absorption effects, it is necessary to know the material composition of the sublayer and the passivation layer as well as the voltage level of the SEM. From this information, constants for the equation above may be derived. For example, the equation as calculated for a passivation layer of a sublayer of Aluminum being scanned by a 15 KeV electron beam is:

$$T=1.754088-4.92148*In+8.45997*In^2-1.6302*In^3 \qquad \text{(Eq. 2)}$$

Equation 1 was derived from equations as found in "Quantitative Chemical Analysis of Individual Microparticles Using the Electron Microprobe: Theoretical", J. T. Armstrong & P. R. Busek, Analytical Chemistry, Vol. 47, No. 13, Nov. 1975, Pages 2178–2192 and "A Simple Method of Electron Probe Determination of Thickness of Thin Film by Monte Carlo Simulation", Y. Ho & Y. Huang, Scanning Electron Microscopy, 1982/II, Pages 559–562. Specifically, equation 1 was derived from the following equation:

$$Absorption\ Function=exp(-(Ua*csc(Phi)*pz)) \qquad \text{(Eq. 3)}$$

wherein

Ua is the mass absorption coefficient for material of atomic number a;

Phi is the exit angle of X-rays from the thin film with respect to a normal line perpendicular to the film surface;

p is the density of the absorption material; and z is the length of the absorption path.

Figure 2:
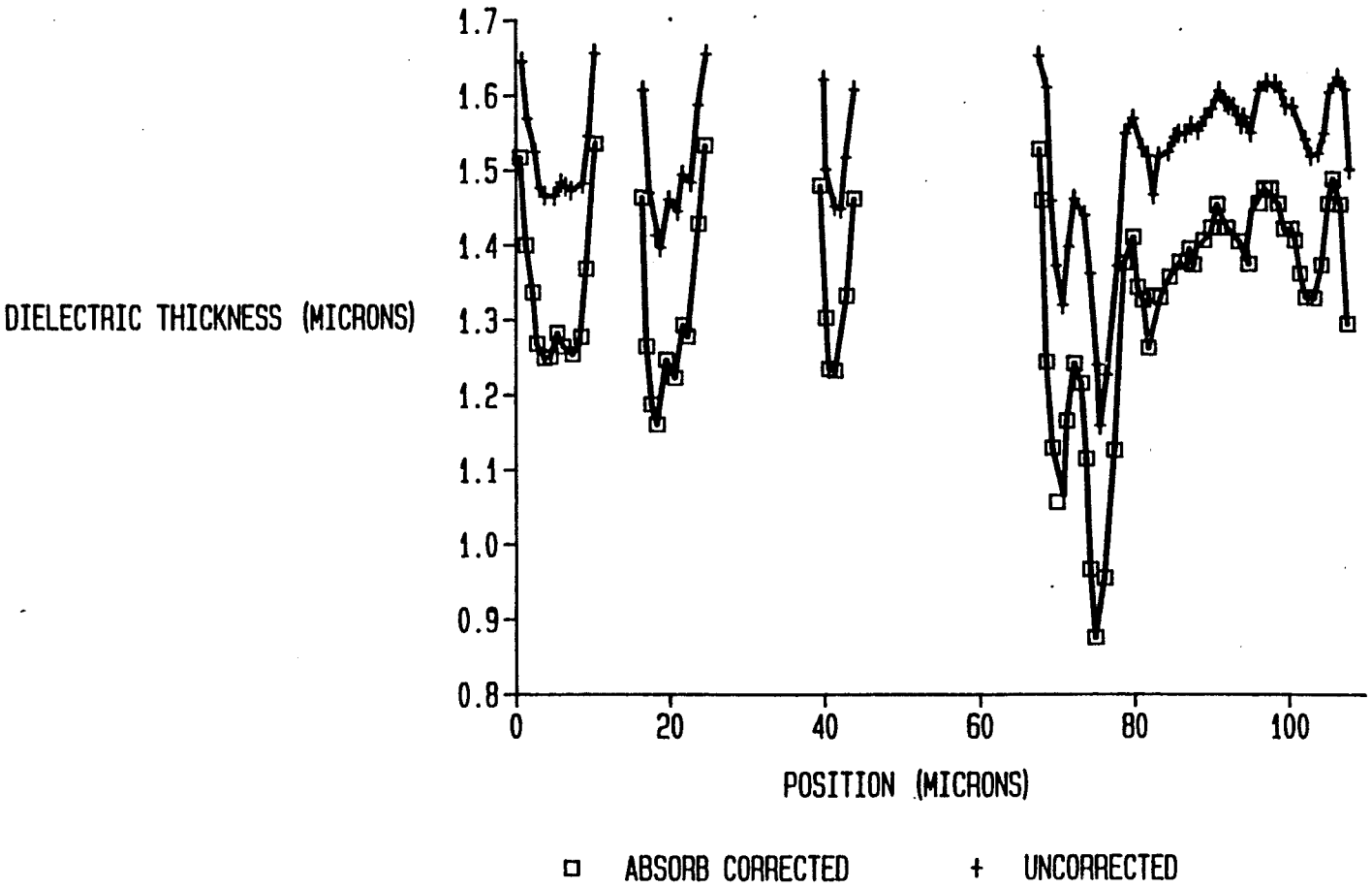
FIG. 2 is a graphical comparison of a scanning X-ray map made by the techniques of the present invention and the method as disclosed in U.S. Pat. No. 4,777,364.
Figure 3:
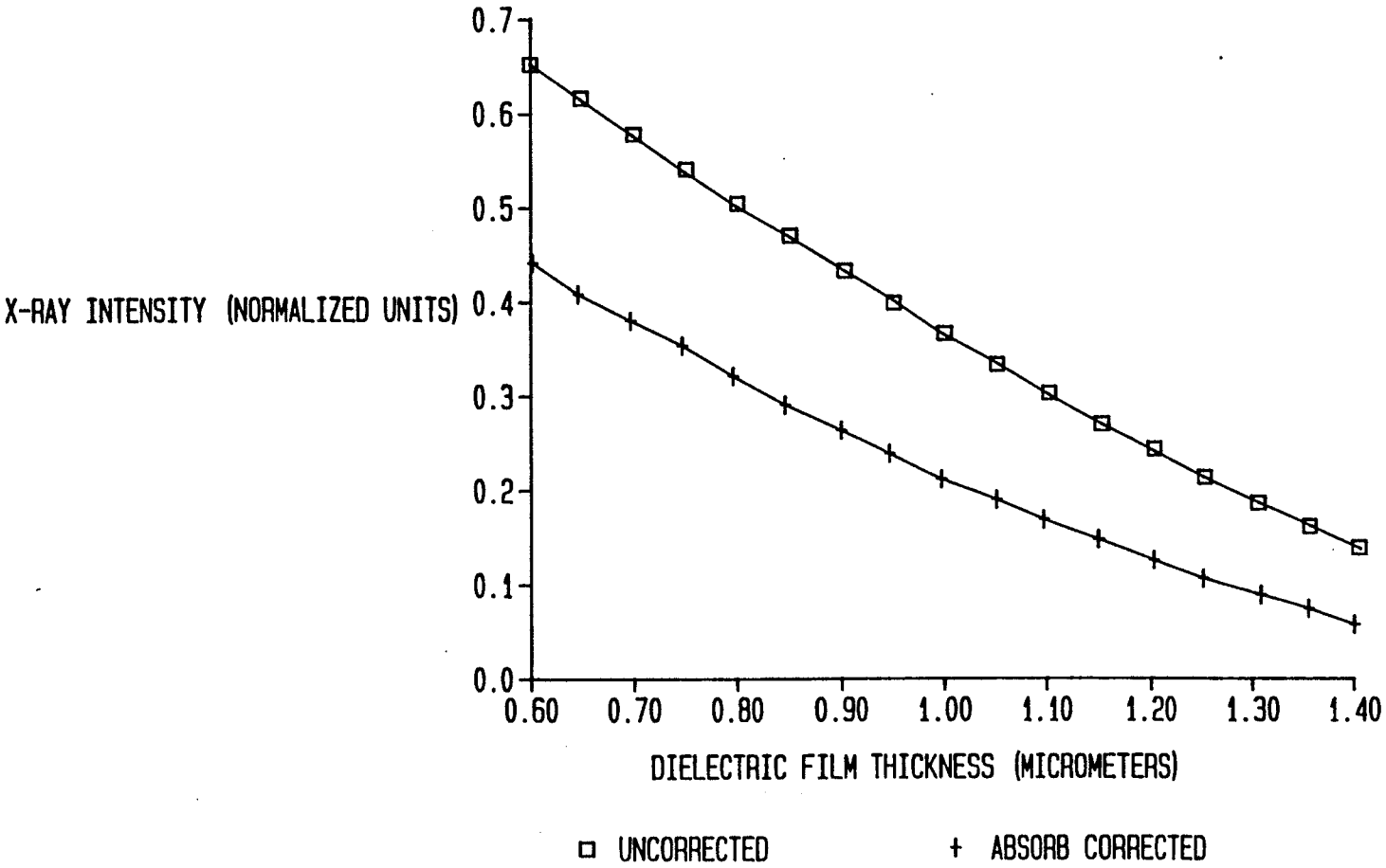
FIG. 3 is a graphical comparison of X-ray intensities calculated using the techniques of the present invention and the method as disclosed in U.S. Pat. No. 4,777,364.

FIG. 2 is a graphical comparison of scanning thickness maps made by the techniques of the present invention and the method as disclosed in U.S. Pat. No. 4,777,364. The scanning thickness maps were of a sample dielectric on aluminum that was scanned at an accelerating voltage of 15 KeV. As is readily apparent when absorption effects are compensated, the dielectric is shown to be thinner than as mapped by the method of U.S. Pat. 4,777,364. This is suggested by FIG. 3 which is a graphical comparison X-ray in ensitie calculated by the techniques of the present invention and the method as disclosed in U.S. Pat. No. 4,777,364. As indicated, when absorption effects are compensated, the entire line representing the relation between X-ray intensity and dielectric thin film thickness is less than when absorption effects are not compensated.

Having thus shown and described what is at present considered the preferred method, it should be understood that the same has been shown by way of illustration and not limitation. Accordingly, all modifications, alterations, and changes coming within the spirit and scope of the invention as defined in the appended claims are herein meant to be included.

What is claimed is:

1. A method of detecting defects and mapping the thicknesses of passivation layers of an integrated circuit comprising the steps of:

directing a narrow, high energy, electron beam to impinge upon an integrated circuit, by increasing the accelerating voltage of the electron beam until the electrons have a minimal amount of energy to penetrate through the thickness of a passivation layer of the integrated circuit;

increasing said voltage a predetermined amount above the voltage required for passivation layer penetration wherein the transmitted electrons serve to interact with a sublayer of film material and to generate distinct X-rays and wherein the predetermined amount of voltage increase is sufficient to achieve a substantially linear relationship between the X-ray intensity from the film material and the thickness of the passivation layer;

raster scanning the increased-intensity electron beam over the area of interest of the integrated circuit;

detecting any X-rays that are generated during the raster scanning of the electron beam;

visually displaying a count of X-rays detected during the raster scanning; and compensating for the absorption effect of the X-rays through the passivation layer and sublayer by a predetermined formula.

2. The method of claim 1 wherein the absorption effect is compensated by utilizing the following formula:

$$T = A - B^{*}In + C^{*}IN^{2} - D^{*}In^{3} \qquad \text{Eq. (1)}$$

wherein

T is the thickness of the thin film in microns;

A, B, C and D are constants that are derived from known values of given combinations of sublayers/-passivation and electron beam voltages; and In is the ratio of the sublayer X-rays from under the passivation layer to the sublayer X-rays from a selected reference point on the Integrated circuit.

3. The method of claim 2 wherein the X-rays detected are visually displayed in three dimensions.

4. The method of claim 2 wherein the passivation layer to be mapped is silicon dioxide, the sublayer is Aluminum, the predetermined voltage is 15 kilovolts, A is equal to 1.754088, B is equal to 4.92148, C is equal to 8.45997 and D is equal to 1.6302.

* * * * *